Nov. 21, 1961     F D. GUGELER     3,009,577
WATER SOFTENER SCREEN
Filed Feb. 5, 1957
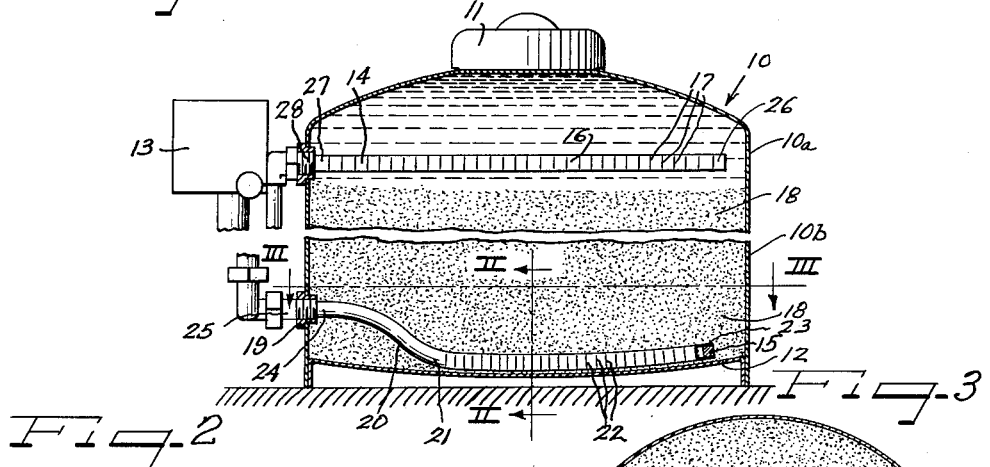
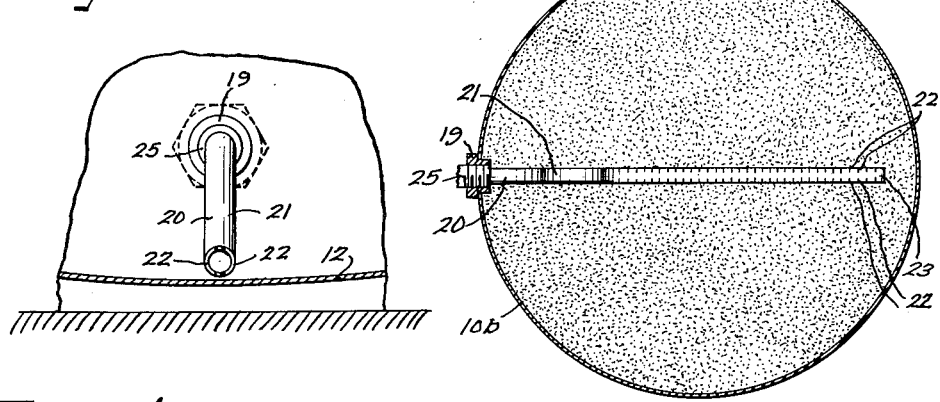
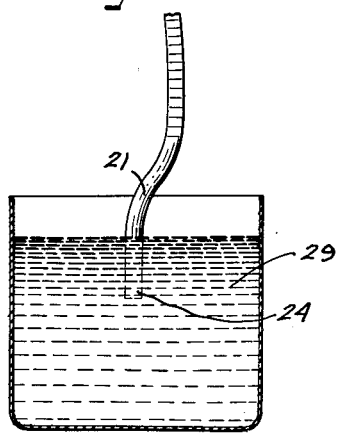
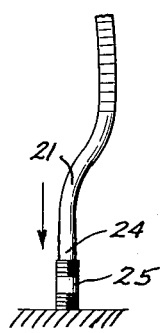
Inventor
Frederick D. Gugeler
by Hill, Sherman, Meroni, Gross

United States Patent Office 3,009,577
Patented Nov. 21, 1961

3,009,577
WATER SOFTENER SCREEN
Frederick D. Gugeler, 2 Greenfield, Lombard, Ill.
Filed Feb. 5, 1957, Ser. No. 638,299
1 Claim. (Cl. 210—289)

This invention pertains to a water softener screen.

In connection with the operation of water softeners, various problems arise. In order that these problems may be fully understood, a brief description is first given of the operation of a typical home water softener. Various chemicals have the property of being able to engage in a cation exchange, and when these chemicals accomplish such exchange with the harder minerals in water, the water is said to have been softened. The typical water softener for performing this process comprises a tank which is filled to a proper level with granular particles of siliceous zeolite or resin through which the hard water must be filtered before it can be withdawn at a given tap. The better water softeners bring the hard water in at the top of the tank, thereby causing the water to flow downward through the bed of chemicals. The water is withdrawn at or near the bottom of the tank. Since the chemicals are present in the bed it is necessary that a screen be placed adjacent to the tank outlet so that the granular particles will not pass into the water distribution system. It follows that the size of the openings must be less than the smallest dimension of the granules to be used. If the water is caused to flow upwardly through the bed for softening, it is apparent that the screen would be located above the top of the bed of chemicals for maximum effectiveness.

It can be seen that if a plumbing fitting is placed at the bottom and center of the tank, clearance would be needed beneath the tank to allow space for the various fittings and parts. Where such a tank structure is employed, its effect is to require that the tank include sufficient material to hold the tank upward from the floor level, thereby requiring additional head room for a tank of a given size.

Since the softener tanks are subjected to water-supply line presures, these tanks must be pressure-tested in accordance with various code requirements. One of the rather common structures utilized to meet various codes and to provide the necessary spacing beneath the tank includes a more or less hemispherical bottom wall, the convex surface being directed toward the interior of the tank. While such a tank design provides the necessary clearance beneath the tank, employing a reasonably simple structure, it has the effect of providing an annular pocket at the bottom of the tank which cannot be properly flushed or drained if a center fitting is employed. On the other hand, if a lateral fitting be employed, the chemicals are not being as efficiently utilized as they might be at center since the water will take a path of least resistance which, for a uniform bed, is the shortest path leading to the outlet.

For purposes of maintenance and repair, it is preferable that a screen be removable from the outside and therefore it must be able to pass through the spud or wall fitting into which it is to be sealed. Thus, it can be seen that if the screen is characterized in shape to fit the bottom of the tank, if the spud or wall fitting be located near the floor of the tank, particularly if the tank has a convex inwardly directed bottom floor, the fitting would have to be located relatively quite far up the wall in order to permit an arcuate screen to rotate as may be required for the insertion.

When the chemicals utilized in the softener have been engaging in the cation exchange for some period of time, they are essentially saturated and hence incapable of further efficient softening. They have also served as a filter and have removed mechanical impurities. In order to regenerate the softener, it is necessary to reversely flow clean water through the softener bed of chemicals so as to flush out the mechanical impurities present between the granules. This is accomplished by flowing this clean water through the softener screen but in the opposite direction. In order to have maximum cleaning or flushing, it is therefore apparent that the flushing operation can best be accomplished if the water is evenly and thoroughly distributed across the cross-section of the bed of chemicals. When this back-flushing has been completed, a saline solution is slowly passed through the chemicals to cause a reverse cation exchange, thereby readying the softener for further use. When the softener screen is in use, it must therefore withstand the effects of water, saline solution, and softening chemicals, and serve as a good collector throughout a substantial portion of the softener cross-section so as to avoid localized collection of softened water.

I have provided a water softener screen which ideally meets all of the foregoing problems and solves them in a particularly unique and simple manner. In the preferred embodiment of my improved water softener screen, plastic material is utilized. I have also provided a novel method of manufacturing my softener screen, which method is applicable as well to plastic devices other than softener screens.

Accordingly, it is an object of this invention to provide a new and improved water softener screen.

A further object of this invention is to provide a water softener screen which will withstand the chemical effects to be encountered in a water softener.

It is an object of this invention to provide a water softener screen which will collect softened water and brine solution from more than a localized area in the tank.

It is also an object of this invention to provide a water softener screen which may be utilized as a distributor of fresh water for back-flushing.

It is an object of this invention to provide a water softener screen which will permit the use of less material in the design of the softener tank, with which it is used, than has been heretofore possible.

It is an object of this invention to provide a water softener screen which permits the height of tank designs to be decreased.

It is an object of this invention to provide a water softener screen which permits the use of thinner material in the tanks for a given test pressure.

It is an object of this invention to provide a screen which will avoid the creation of internal pockets of stagnant water.

A still further object is the provision of a water softener screen which will permit the full utilization of the granules in the softener tank.

It is a further object of the invention to provide a water softener screen which may be installed and removed from the tank through and by means of a fitting in the wall.

A still further object of this invention is that the screen should be usable with spuds located in the wall of a tank directly adjacent to the bottom of the wall.

Other objects, features and advantages of this invention will be apparent from the following detailed description of the attached sheet of drawings, which illustrates the invention.

As shown on the drawings:

FIGURE 1 is a cross-sectional view of the upper and lower ends of a water softener with the screens shown in elevation;

FIGURE 2 is a partial view taken along lines II—II of FIGURE 1;

FIGURE 3 is a cross-sectional view taken along line III—III of FIGURE 1; and

FIGURES 4 and 5 illustrate two steps in a method for joining a plastic article with another part.

Referring to FIGURE 1, there is shown a water softener tank 10 which has an upper portion 10a and a lower portion 10b. A removable cap 11 is located on the upper portion, which cap permits the addition of softening chemicals. The lower portion 10b has a bottom 12 which is concavely shaped, the concave surface facing toward the interior of the tank. Of course, the bottom 12 is joined at its perimeter to the side walls of tank 10 to form a structurally tight seal and base. In a typical installation, fresh water normally is admitted through valve 13 from its source to the interior of the top of the tank 10a. Fresh hard water enters through the upper screen 14, which receives the fresh hard water at its outer end 27, conducts it along its hollow center throughout its length along body portion 16, and out through each of a series of narrow openings or slots 17. Thereafter, the water is filteringly passed through the softening chemical, such as zeolite 18, and is withdrawn at an outlet spud 19 for distribution to the piping system which is to receive softened water. When the water has flowed downward through the bed of zeolite, or other softening chemicals 18, it is collected by the lower tank screen 20 which is positioned adjacent to the bottom 12 of the tank 10. Lower screen 20 is similar to upper screen 14 in structure, except that it has been provided with a curve throughout its body portion 21 so as to enable it to lie closely along the bottom 12 of the tank. The body portion 21 also has a series of openings or narrow slots 22 longitudinally arranged throughout a substantial portion of the length of the body portion.

Thus it can be seen that when the tank softens water with a downward flow, the upper tank screen 14 serves as a distribution device while the lower screen 20 serves as a collection device. However, upon back-flushing, the lower screen serves as a distribution device and the upper screen 14 serves as the collection device. Thus it is apparent that the screens 14 and 20 may also be utilized in a softener where the water is normally upwardly passed during the softening cycle.

The lower tank screen 20 comprises a suitable length of plastic tubing such as, but not limited to, unplasticized polyvinyl chloride. The tubular material has an inner end 23, an outer end 24 and an intermediate body portion 21. The inner end 23 is closed, as by a plug or other means 15. The outer end 24 is provided with a nipple 25 which sealingly surrounds the outer end 24 of the lower tank screen 20. The nipple 25 is preferably threaded at its inner and outer ends, the inner threads thus being able to sealingly join with the spud 19 while the outer threads are available for connection to external plumbing. Of course any other design or style of nipple or fitting may be utilized so long as it performs the necessary functions. The intermediate body portion 21 of the lower tank arm 20 has a plurality of narrow openings or slots which are longitudinally arranged on either side of the body portion 21 as best seen in FIGURE 3. It is important that the width of these slots be narrower than the smallest dimension of the granular softening chemical with which the screen will be used. It will be noted that the body portion 21 also has a curved configuration. Throughout the portion illustrated as having slots 22, a gentle curve is provided which corresponds to the shape of the bottom of tank 12. Thus the slots are located immediately adjacent to the bottom and are directed in opposite directions from each side of the screen, as best seen in FIGURE 3. The body portion has a different curve between the outer end 24 and the slots 22. It is necessary, of course, that the spud 19 of the tank be located a sufficient distance above the floor so that the fittings may be attached by use of hand tools, such as wrenches. It is therefore necessary that an S-shaped curve be added between the outer end 24 and the first of slots 22. All of the curves are gradual so that the entire internal portion of the screen may be inserted from the outside of the tank through the opening in spud 19. The shape is such that the screen may be rotated for said engagement and left in a position whereby the slotted portion of the body 21 is adjacent the bottom 12 of the tank as illustrated.

It will be noted that the structure of the upper tank screen 14 follows the same general principles as the lower tank screen 20, except that the curves in the body portion have been omitted. Thus a hollow tubular plastic material has an inner end 26, an outer end 27 and an intermediate body portion 16. The inner end 26 is closed, the body portion 16 has a series of narrow openings or slots 17, and the outer end 27 is pressed into a nipple or fitting 28. The joint between the outer end 27 and the nipple 28 is similar to that of the lower tank screen 20. It can be seen in FIGURES 1 and 3 that screens 14 and 20 extend substantially all the way across the tank 10. Assembly of the upper screen 14 is effected by manipulating the screen into the corresponding spud opening and then securing the nipple or fitting fixedly into the spud.

The screen may be manufactured by heating a suitable length of tubing in a bath until the tubing reaches a temperature between 220° and 240° F., assuming that unplasticized polyvinyl chloride is being used. At any event, the temperature to which the tubing is raised is that necessary for softening the material. Thereafter, the heated tubing material is inserted in a mold having the desired shape. It is seen that the mold could at this point close the ends 23 and 26 respectively. It is also seen that the mold could impart the desired curve, straightness, or the like. After the material has been allowed to cool, narrow slots are milled in opposite sides of the material. This is best done by a series of gang saws mounted on a common mandrel. It is apparent that the mold may be so designed that it also serves as the fixture for holding the material for the sawing. Of course, the machining of the suitable screen openings in the tubing may be accomplished between any steps in the process. Further, the outer ends are dipped in a solvent, which, in the case of unplasticized polyvinyl chloride, is methylethyl-ketone 29. The solvent reacts physically with the material to soften it for a distance coextensive with its insertion as shown in FIGURE 4. The insertion is continued for a period of approximately 30 seconds after which the softened end is forced into nipple 25 as shown in FIGURE 5. Of course this process may also be utilized for the outer end 27. This forcing of the material into the nipple 25, 28 produces a leak tight seal. The same process may be repeated, if desired, whereby a plastic or metal plug 15 may be inserted in the opposite end, assuming that the tubing has not been otherwise closed. Thus the plastic material has been solvently welded to the nipple 25. It is apparent, of course, that if other materials are used, other solvents might be used. Further, this solvent welding method may be utilized in connection with other structures than those shown in the drawings.

Thus it can be seen that a water softener screen has been provided which may be produced at a substantially lower cost compared to prior metallic screens mounted in the bottom of the dished softener tank. This screen enables the efficient use of a transverse tubular screen in a dished tank bottom. Furthermore, it improves the efficiency of the operation in that distribution and collection occur over a wider area and that stagnant pockets are avoided. The use of this type of screen permits the use of a design of tank having a lower bottom, shorter height and with lighter gauge steel which withstands the required test pressures. Further, the device may be removed, replaced or serviced by mere removal of the fitting from the spud. It also has the necessary chemical properties to withstand the environment encountered in service.

It will be understood that numerous modifications and variations may be effected without departing from the scope of the novel concepts of the present invention.

I claim as my invention:

In a water softener tank having an upright side wall, a spud sealably secured to the side wall near its lower edge and having a threaded opening communicating with the interior of the tank, a bottom wall in said tank having a concave interior surface directed toward and disposed entirely beneath the spud opening, the improvement in combination therewith of a fluid exchange screen assembly, said screen assembly comprising a unitary tube disposed in said tank and having a diameter smaller than that of said opening, a tubular fitting sealably receiving and supporting an open end of said tube within said fitting, said fitting having external threads sealably supported by the threads of said spud and also being adapted to be fluidly connected to external piping, said screen assembly being installable and removable as a single unit through said spud opening, said tube having a curved portion corresponding in shape to said concave inner surface and disposed adjacent to the lowest portion thereof, said tube being suitably apertured at least at said curved portion to preclude the passage of solid particles through said screen assembly, said tube being sufficiently rigid throughout its length to preclude collapse of its apertures in response to external water pressure, and to insure proper positive disposing of said curved portion during installation thereof.

References Cited in the file of this patent

UNITED STATES PATENTS

| | | |
|---|---|---|
| 429,688 | Hyatt | June 10, 1890 |
| 1,747,470 | Duden | Feb. 18, 1930 |
| 2,536,196 | MacLeod | Jan. 2, 1951 |
| 2,627,503 | Anderson | Feb. 3, 1953 |
| 2,664,373 | Reilly | Dec. 29, 1953 |
| 2,695,255 | Avery | Nov. 23, 1954 |
| 2,768,750 | Kryzer | Oct. 30, 1956 |
| 2,771,320 | Korwin | Nov. 20, 1956 |
| 2,773,829 | Hunting | Dec. 11, 1956 |
| 2,809,158 | Yustick | Oct. 8, 1957 |